(12) United States Patent
Lee

(10) Patent No.: US 6,299,403 B1
(45) Date of Patent: Oct. 9, 2001

(54) SPARE TIRE CARRIER

(75) Inventor: Ok-Seok Lee, Kyunggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/474,809

(22) Filed: Dec. 29, 1999

(30) Foreign Application Priority Data

Jul. 27, 1999 (KR) .................................. 99/30558

(51) Int. Cl.$^7$ .................................................. B62D 43/10
(52) U.S. Cl. .................. 414/463; 414/477; 414/558; 224/42.21; 254/323
(58) Field of Search .................... 414/463, 464, 414/477, 558; 224/42.21, 42.23; 254/323

(56) References Cited

U.S. PATENT DOCUMENTS

| 4,059,197 | * | 11/1977 | Iida ........................ 214/451 |
| 4,535,973 | * | 8/1985 | Don et al. ................. 254/323 |
| 4,997,164 | * | 3/1991 | Kito et al. ................. 254/323 |
| 5,027,933 | * | 7/1991 | Barnum et al. .............. 192/56 L |
| 5,110,093 | * | 5/1992 | Rempinski et al. ........... 254/266 |
| 5,125,628 | * | 6/1992 | Rempinski et al. ........... 254/323 |
| 5,251,877 | * | 10/1993 | Rempinski et al. ........... 254/323 |
| 5,265,708 | * | 11/1993 | Barnum et al. .............. 192/56 R |
| 5,277,288 | * | 1/1994 | Barnum et al. .............. 192/56 |
| 6,092,790 | * | 7/2000 | Dobmeier et al. ............ 254/323 |
| 6,116,579 | * | 9/2000 | Aldridge et al. ............. 254/323 |

* cited by examiner

Primary Examiner—Joseph A. Fischetti

(57) ABSTRACT

A spare tire carrier having a housing fixed to the automobile body, a roller assembly rotatably mounted at a rotary shaft of the housing and constructed with a plurality of closely-adhered roller plates to allow a wire to wind and unwind therebetween, and a gear plate fixed to one side of the roller assembly and formed with a first gear having a predetermined length of diameter, the carrier comprising: a plurality of split-constructed contact gears respectively meshed to a part of the first gear; an eccentric cam formed at the rotary shaft; and a resilient member mounted between the eccentric cam and the plurality of contact gears to apply a pressure to the plurality of contact gears towards the first gear, such that the wire is prevented from being squeezed in a gap of the roller assembly and the carrier is prevented from being inoperable, while the carrier swiftly operates to prevent the first and second gears from being broken down when an excessive force is applied and strength of an accommodation plate where the spare tire is seated is strengthened to thereby prevent its breakage even if frequent replacement of the spare tire occurs.

7 Claims, 6 Drawing Sheets

SPARE TIRE CARRIER

BACKGROUND OF THE INVENTION

1. Field of the Invention

The present invention relates to a spare tire carrier, and more particularly to a spare tire carrier mounted on a truck or a freight car.

2. Description of the Prior Art

Generally, space is limited in an automobile, particularly a truck or a freight car for accommodating a spare tire, such that a separate carrier is mounted underneath the automobile for accommodation of the space tire.

The spare tire carrier includes, as illustrated in FIGS. 4 to 6, a housing 50 fixedly mounted underneath an automobile and formed in "U" shape, a roller assembly 53 rotatably mounted to the housing 50 via a rotary shaft 51 and wound by a wire 52, and a hitching device so constructed as to enable the roller assembly 53 to rotate to a wire's winding direction and to be hitched to a wire's unwinding direction. The roller assembly 53 is constructed such that first and second roller plates 54 and 55 are coupled by a pin 56 and the wire 52 is wound therebetween.

Furthermore, the hitching device is provided with a gear plate 58 coupled to one side of the first and second roller plates 54 and 55 and formed with a first gear 57 having a predetermined diameter and a rotary plate 61 formed with a second gear 59 having a diameter smaller than that of the first gear 57 and eccentrically inserted with the first gear 57 and rotatably supported by an eccentric cam 60 of the rotary shaft 51.

At this location, the wire 52 is provided with an oval accommodation plate 62 at a longitudinal end thereof for a spare tire (T) to be accommodated therein and a guide plate 63 for preventing the wire 52 from being dislodged from the roller assembly 53, where the rotary plate 61 is resiliently supported by a spring 64 to be pulled downwards at all times. The accommodation plate 62 is protrusively formed with a plurality of support ribs 65 in order to support a position of the spare tire (T).

Now, operation of the spare tire carrier thus constructed will be described.

First of all, the spare tire (T) is inserted through a smaller diameter of the oval accommodation plate 62 to cause the support rib 65 to support the spare tire (T). Under this state, when a rotating force is input via the rotary shaft 51, part of the second gear 59 at the rotary plate 61 is meshed with the first gear 57 and rotated.

At this time, the rotary plate 61 is rotated by the eccentric cam 60 formed at the rotary shaft 61, where the second gear 59 is meshed towards the rotating direction of the first gear 57 and rotated.

When the first gear 57 is rotated by the rotary plate 61, the gear plate 58 formed with the first gear 57 couples with the roller assembly 53 to cause the roller assembly 53 to rotate and to make the wire 52 wind or unwind. At this time, if the force rotating the rotary shaft 51 is excessive, the rotary plate 61 copes with the resilience of the spring 64 by being rotated clockwise, by which the excessive force is absorbed to prevent breakage of the first and second gears 57 and 59.

Under a state where the wire 52 is wound, the wire 52 remains wound even though it is pulled downwards by the load of the spare tire (T). The reason the wire 52 is not unwound is that the first and second gears 57 and 59 are eccentrically meshed. In other words, if the force is applied towards the rotary shaft, the wire 52 is not disentangled.

In other words, only if the force is applied towards the rotary shaft 51, the roller assembly 53 is rotated to wind or unwind the wire 52.

However, there is a problem in that, when the first and second roller plates are adhered and coupled by a pin in order to wind the wire to which the force is applied, the pin cannot restrain the first and second roller plates if an excessive force is applied via the wire, such that the housing and roller plate are widened to cause the wire to be caught in between the housing and the roller plate, resulting in an inoperable state.

In other words, the first and second roller plates are relatively easily widened when an excessive force is applied to the wire because the pin only restrains the position of the first and second plates and the housing apply a pressure for adhering and coupling the first and second roller plates, thereby causing the wire to be wedged therebetween.

Furthermore, there is another problems in that because the support rib at the accommodation plate where the spare tire is accommodated is relatively weak, and when the spare tire is frequently replaced, the support rib can be easily broken or deformed.

There is still further problem in that, because the rotary plate, provided to prevent breakage of the first and second gears when an excessive force is applied toward the rotary shaft, is rotated around the eccentric cam and is operated at a part relatively long distanced from the part where the excessive force is applied, response to the operation is slow, and if the resilient adjustment of the spring is not accurate, operating force can be deteriorated.

SUMMARY OF THE INVENTION

The present invention solves the aforementioned problems. It is an object of the present invention to provide a spare tire carrier adapted to prevent a wire from being wedged therein due to a widened roller assembly and to avoid the carrier from inoperability. The present invention is constructed to swiftly operate when an excessive force is applied to thereby prevent breakage of first and second gears.

It is another object of the present invention to provide a spare tire carrier adapted to improve strength of an accommodation plate where the spare tire is seated to thereby prevent its breakage even if frequent replacement of the spare tire occurs.

In accordance with the objects of the present invention, there is provided, a spare tire carrier having a housing fixed to the automobile body, a roller assembly rotatably mounted at a rotary shaft of the housing and constructed with a plurality of closely-adhered roller plates to allow a wire to wind and unwind therebetween, and a gear plate fixed to one side of the roller assembly and formed with a first gear having a predetermined length of diameter, the carrier comprising:

a plurality of split-constructed contact gears respectively meshed to a part of the first gear;

an eccentric cam formed at the rotary shaft; and a resilient member mounted between the eccentric cam and the plurality of contact gears to apply a pressure to the plurality of contact gears towards the first gear.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
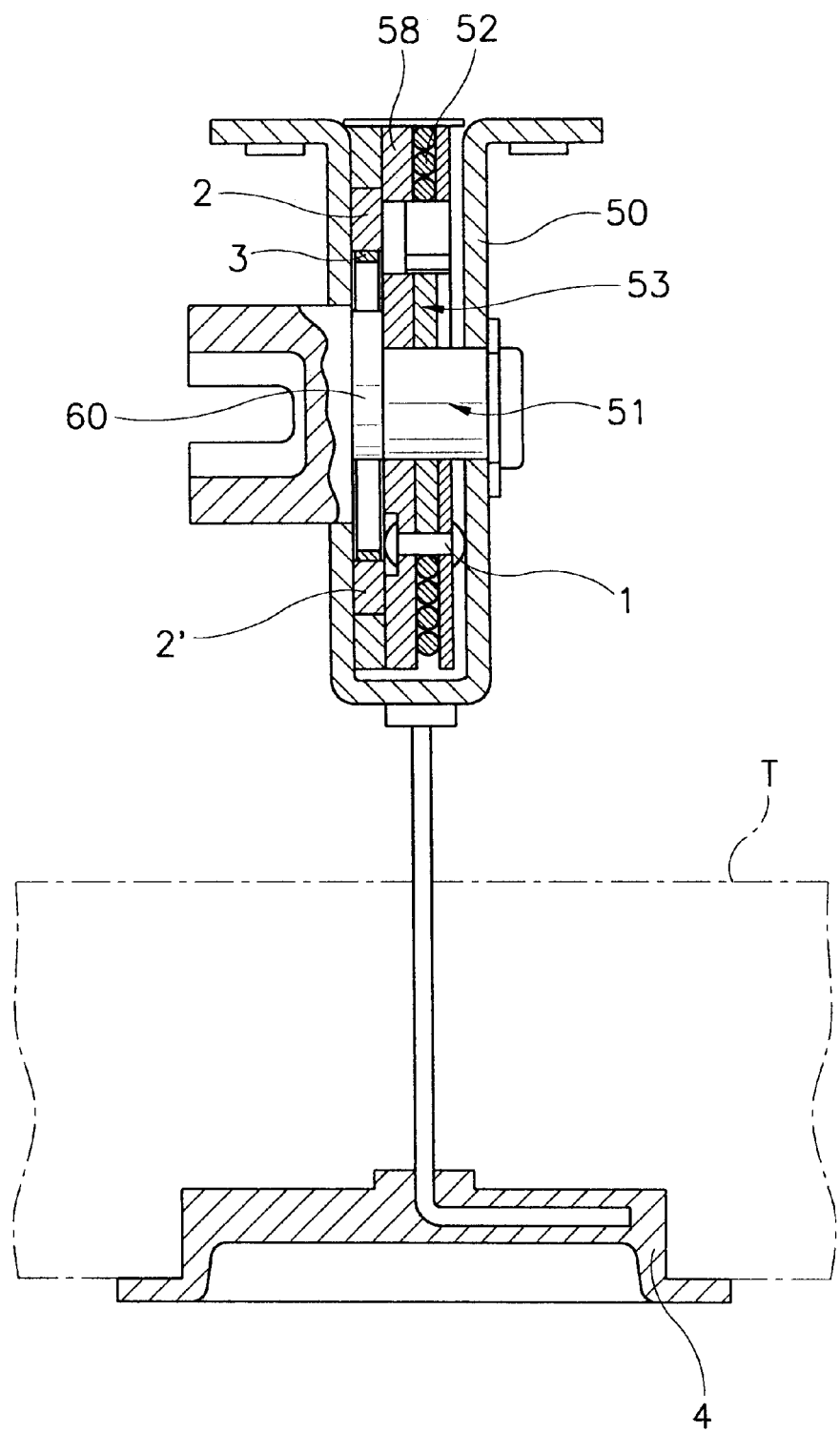
FIG. 1 is an assembled sectional view for illustrating a spare tire carrier for an automobile according to the present invention.
Figure 2:
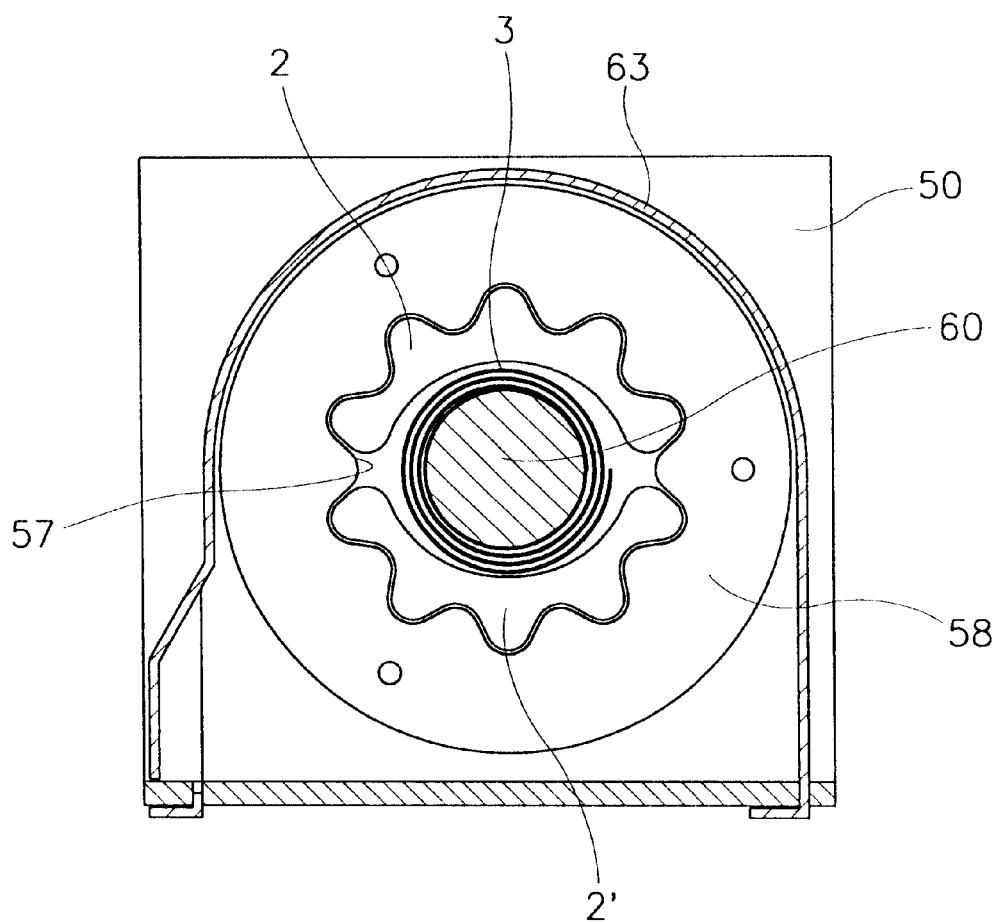
FIG. 2 is a side sectional view of FIG. 1.
Figure 3:
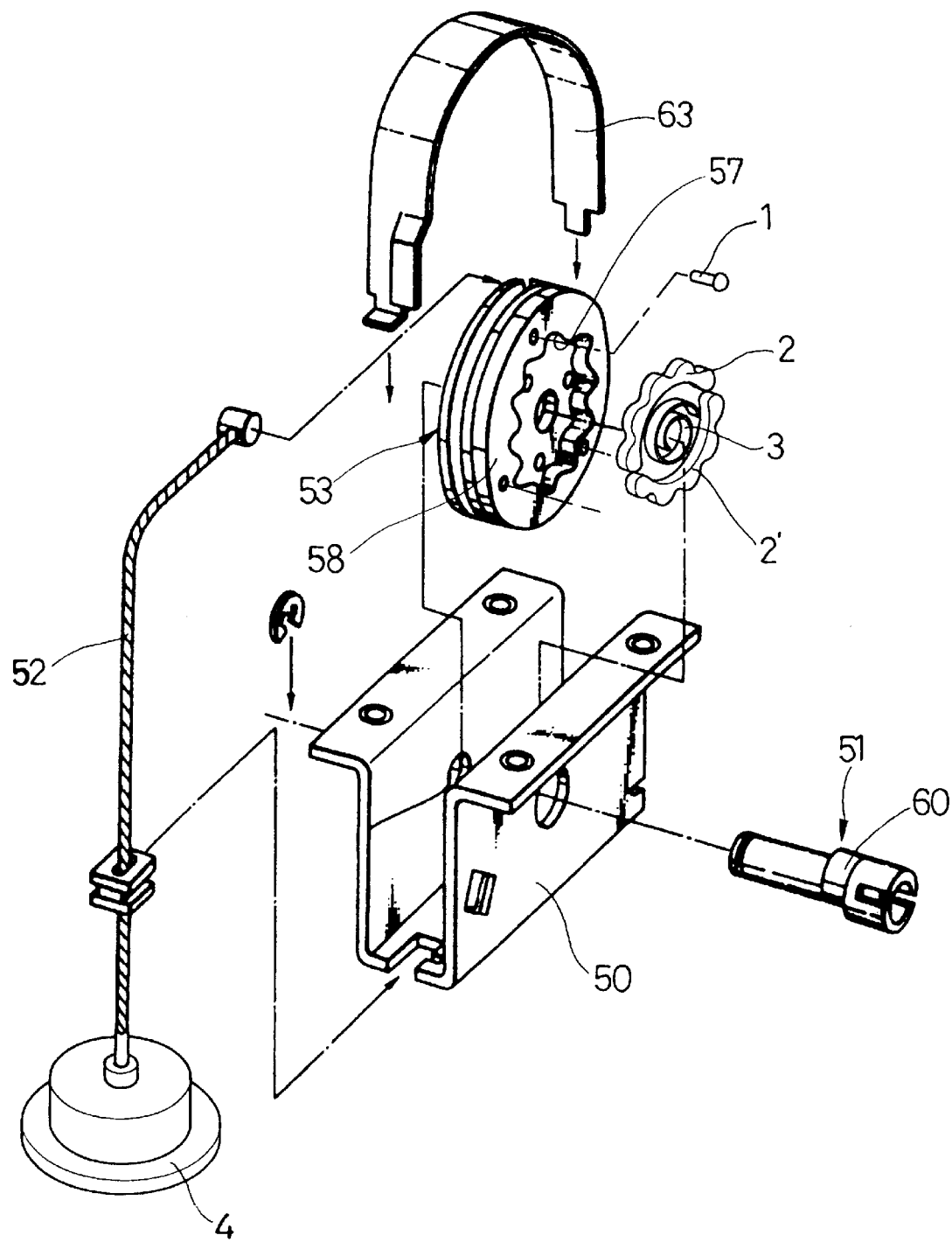
FIG. 3 is an exploded perspective view of FIG. 1.
Figure 4:
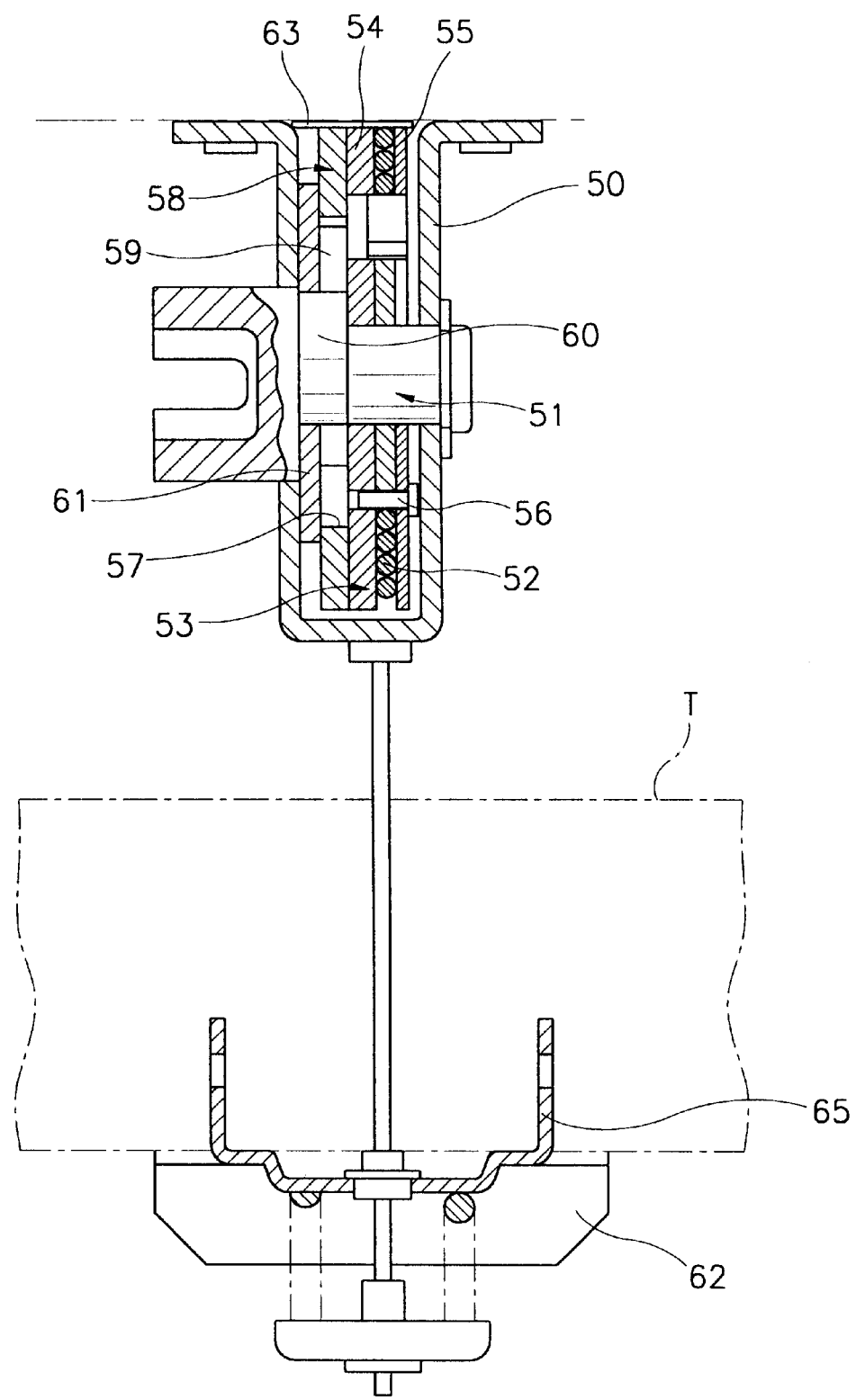
FIG. 4 is an assembled sectional view for illustrating a conventional spare tire carrier.
Figure 5:
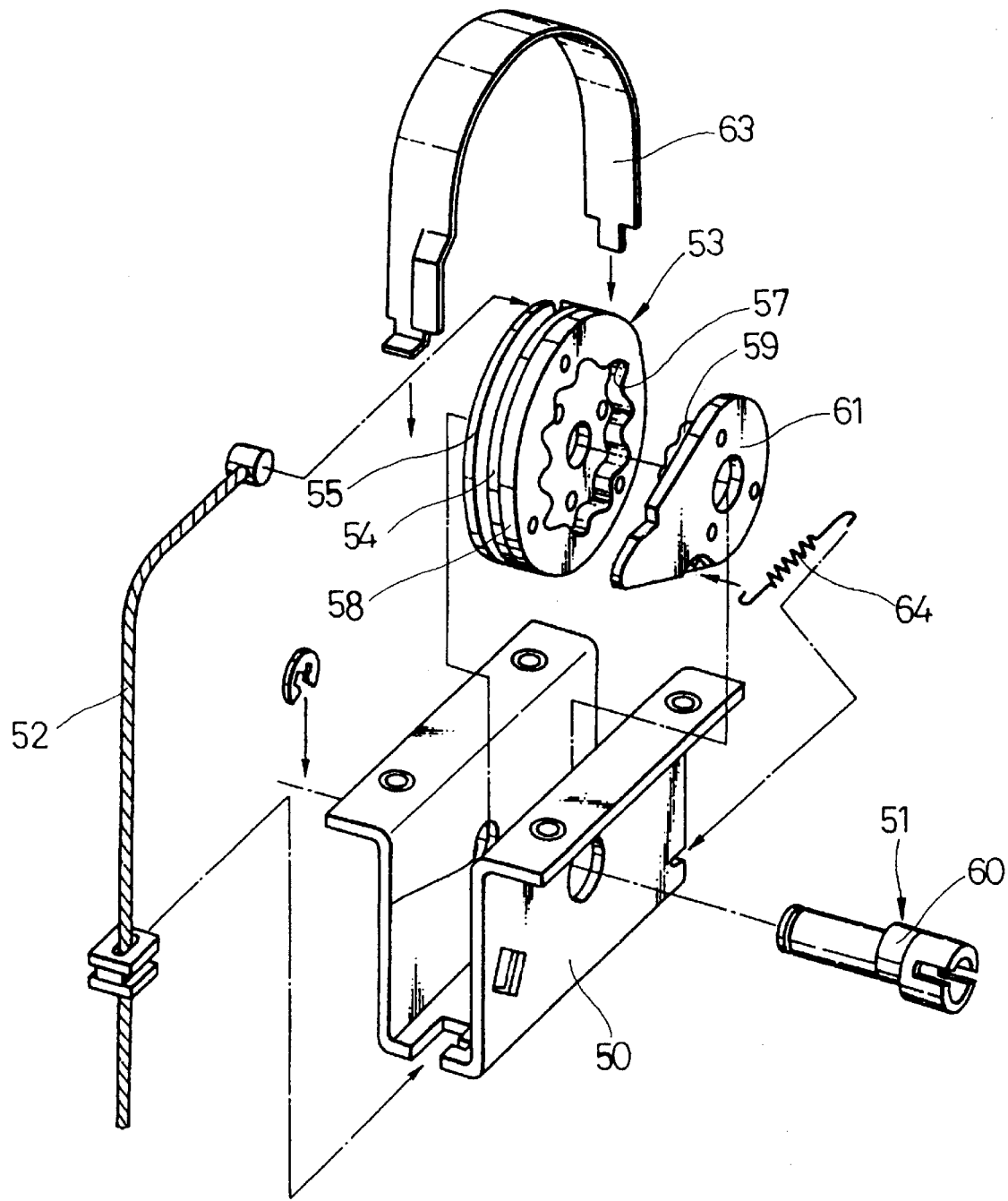
FIG. 5 is an exploded perspective view of FIG. 4.
Figure 6:
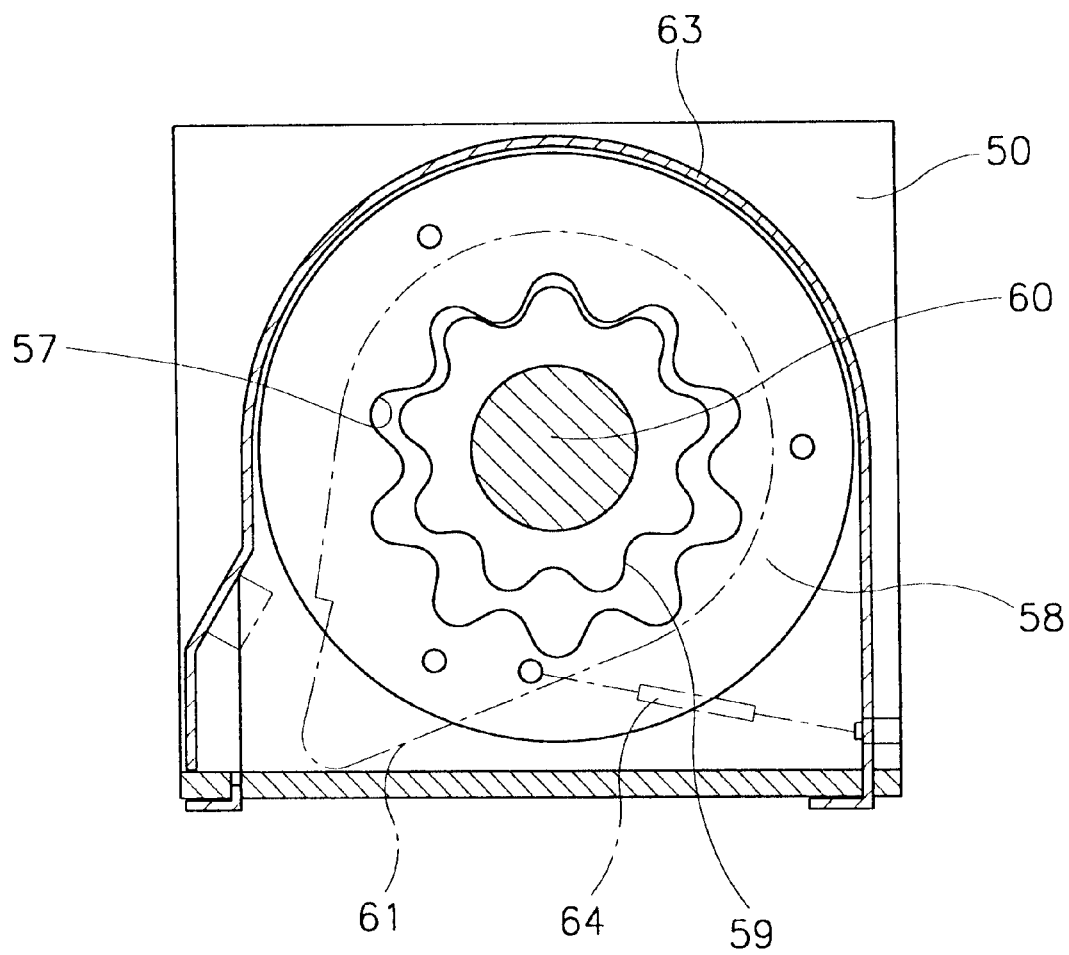
FIG. 6 is a side sectional view of FIG. 4.

FIGS. 1, 2 and 3 are respective assembled sectional view, side sectional view and exploded perspective view for illustrating a spare tire carrier according to the present invention, where the roller assembly 53 rotatably coupled to the rotary shaft 51 at the housing 50 is coupled by a fixing member such as rivet 1, two split contact gears 2 and 2' are inserted so as to be meshed with the first gear 57 of the gear plate 58 coupled to one side of the roller assembly 53, and a resilient member such as spiral spring 3 is arranged to push the contact gears 2 and 2' towards the first gear 57.

In other words, in a state where the plurality of contact gears 2 and 2' are pressed to get meshed at all times by a spiral spring 3, the roller assembly 53 can be rotated while the rotary shaft 51 is rotated.

Of course an inner surface of the spiral spring 3 is adhered to eccentric cam 60 formed at the rotary shaft 51 while an outer surface is adhered to the contact gears 2 and 2'. Furthermore, the contact gears 2 and 2' are so formed at inner surfaces thereof as to distance themselves at a predetermined distance from the eccentric cam 60 to allow the spiral spring 3 to compress and to expand, while the rivet 1 is mounted at a position not interfered by the contact gears 2 and 2'. An accommodation plate 4 for seating the spare tire (T) integrally manufactured in a cast while the wire 52 is internally inserted is fixedly arranged at a longitudinal end of the wire 52. When the accommodation plate 4 and the wire 52 are integrally manufactured in a cast, the wire 52 is bent at a predetermined angle, such that the wire 52 should be made not to be slipped out when applied by a load.

Now, operation of the present invention thus constructed will be described. When an operator rotates the rotary shaft 51 using a handle (not shown) to lower the spare tire (T), the rotary shaft 51 is rotated to rotate the roller assembly 53. In other words, when the eccentric cam 60 formed at the rotary shaft 51 is rotated, one of the contact gears 2 and 2' adhered at an outside thereof via the spiral ring 3 is pressed to the first gear 57 and the other contact gear is loosely meshed, showing a similar operation to that of the first and second gear 57 and 59 eccentrically rotated according to the prior art, to thereby rotate the roller assembly 53.

When the roller assembly 53 is rotated, the wire 52 is unwound, and when the wire 52 is loosely unwound, the spare tire (T) can be lowered from the accommodation plate 4. After the spare tire (T) is replaced, another spare tire or flat tire is seated into the accommodation plate, and the rotary shaft 51 is rotated in the reverse direction to wind the wire 52.

By way of example, if the wire 52 is wound clockwise, an operator should rotate the rotary shaft 51 clockwise.

When the rotary shaft 51 is rotated clockwise, the first gear 57 and the contact gears 2 and 2' are meshed and cooperatively rotated, by which, the roller assembly 53 is rotated to wind the wire 52.

At this time, if an excessive force is applied to the rotary shaft 51 or to the wire 52, the contact gears 2 and 2' serve to compress the spiral 3 to separate same is from the first gear 57, thereby preventing breakage of the first gear 57 or the contact gears 2 and 2'. Particularly, if an excessive force is applied via the wire 52, the first gear 57 to which the force is applied and the spiral spring 3 are mutually approached, where, the spiral spring is rapidly compressed to absorb the excessive force. In other words, because the spiral spring 3 is disposed at a position close to a motion point (breakage point of the first gear and the contact gear) when an excessive strong force enough to instantly break the first gear 57 and the contact gears 2 and 2' is applied, the operation thereof is realized very rapidly, thereby preventing failure of the first gear 57 or the contact gears 2 and 2' flawlessly.

Furthermore, because the roller assembly 53 is securely coupled by the rivet 1, the roller assembly 53 is not widened even if an excessive force is applied thereto through the wire 52, such that an inoperable state of the carrier due to hitch by the roller assembly 53 and the wire 52 can be avoided.

The invention being thus described, it will be obvious that the same may be varied in many ways. Such variations are not to be regarded as a departure from. the spirit and scope of the invention, and all such modifications as would be obvious to one skilled in the art are intended to be included within the scope of the following claims.

Expansion of the spiral spring 3 can be very swiftly realized to thereby return to an original state when the excessive force is not supplied. When an operator separates a handle from the rotary shaft 51 under this state, the roller assembly 53 is not rotated due to the eccentric cam 60 and the contact gears 2 and 2', making the wire 52 remain unwound. At this time, the accommodation plate 4 is manufactured in a cast of metal, such that the plate 4 is not broken easily even the spare tire (T) is repeatedly replaced.

As apparently from the foregoing, there is an advantage in the spare tire carrier according to the present invention in that a roller assembly on which a wire is wound is securely coupled by a rivet to thereby prevent the roller assembly from being widened and to avoid the wire from being wedged between the widened crack thereby preventing the carrier from being inoperable.

There is another advantage in that a spiral ring located near to a force-applied place can be rapidly expanded and shrunk when a excessive force is applied to the wire or a rotary shaft, thereby preventing the first gear and the contact gears from being broken down.

What is claimed is:

1. A spare tire carrier having a housing fixed to an automobile body, said carrier comprising:

a roller assembly rotatably mounted to a rotary shaft of the housing and constructed with a plurality of closely-adhered roller plates;

a wire positioned between said closely-adhered roller plates for winding and unwinding in conjunction with an operation of said rotary shaft;

a gear plate fixed to a first side of the roller assembly, said gear plate including a first gear therein having a predetermined diameter;

a plurality of split-constructed contact gears respectively meshed with a part of the first gear;

an eccentric cam formed at the rotary shaft; and a resilient member mounted between the eccentric cam and the plurality of split-constructed contact gears to apply a contact pressure, said contact pressure maintaining at least one of said of said split-constructed contact gears in contact with said first gear.

2. The carrier according to claim 1, wherein the plurality of roller plates comprising the roller assembly is securely coupled together by a fixing member.

3. The carrier according to claim 1, wherein the carrier further comprises an oval-shaped accommodation plate, and a longitudinal end of the wire is inserted in bent form and is integrally formed in a cast with said accommodation plate, and the spare tire can be seated thereon.

4. The carrier according to claim 2, wherein the carrier further comprises an oval-shaped accommodation plate integrally formed in a cast, such that a longitudinal end of the wire is inserted in bent form for securely engaging said accommodation plate, and the spare tire can be seated thereon.

5. The carrier according to claim 4, wherein said accommodation plate is formed of a single-piece cast having a unitary construction.

6. The carrier according to claim 2, wherein said fixing member is a rivet.

7. The carrier according to claim 4, wherein said resilient member includes a spiral spring engaged with said eccentric cam and an outer surface of said spiral spring is adhered to said split-constructed contact gears.

* * * * *